Figure 1:
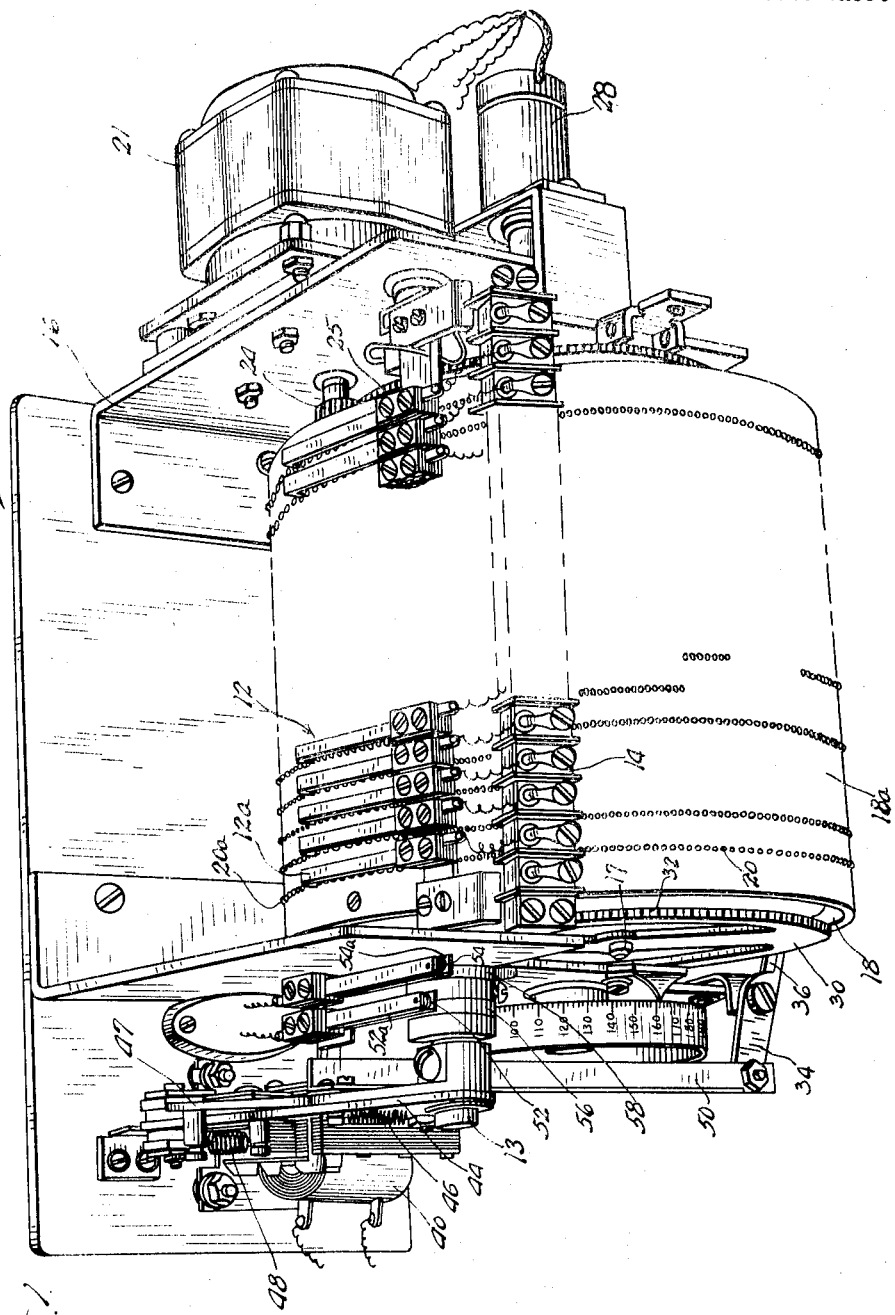

INVENTOR.
Raymond E. Zenner
BY.
Olsen, Mecklenburger, von Holst,
Pendleton & Neuman. Attys.

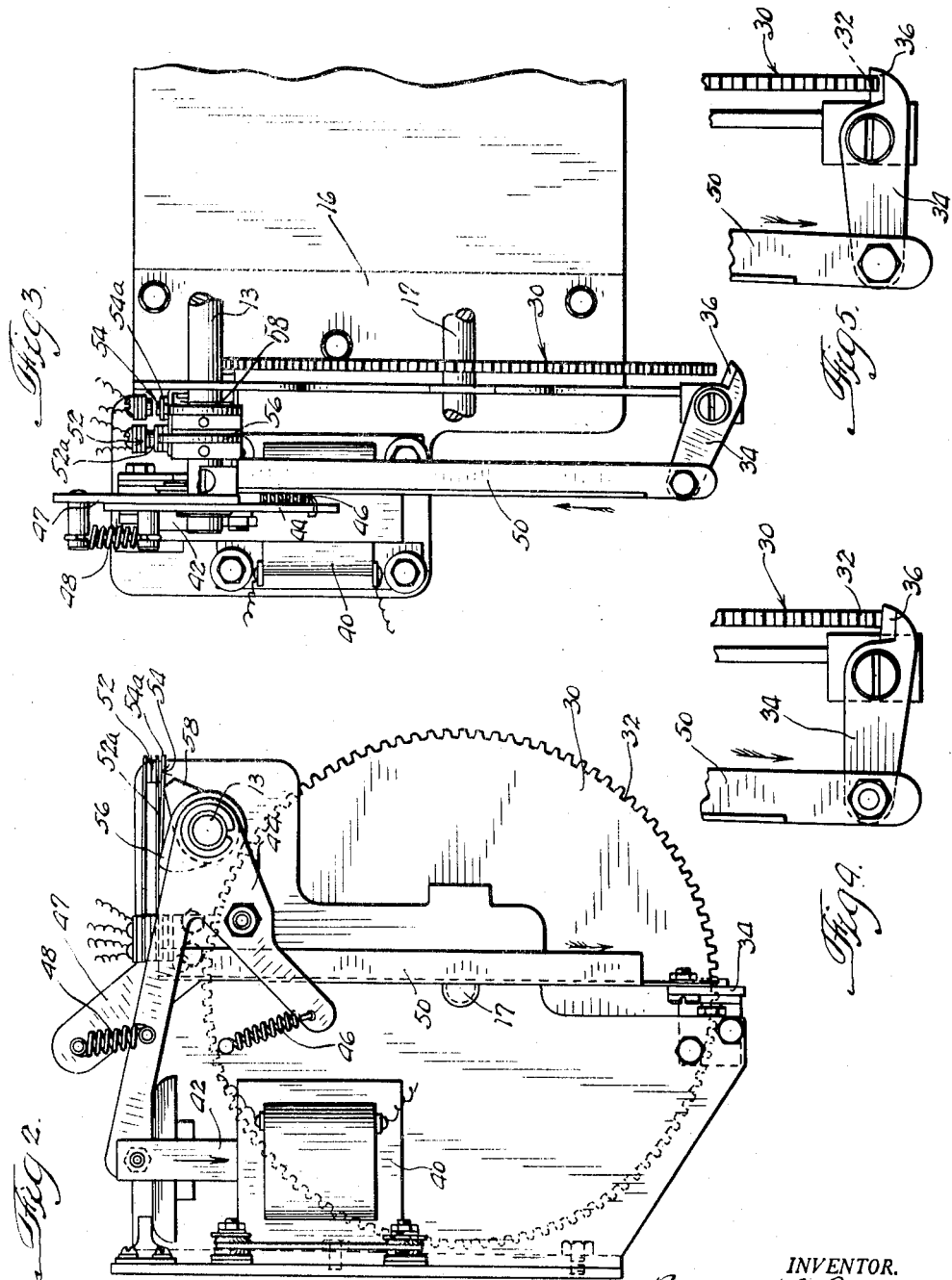

Aug. 29, 1961    R. E. ZENNER    2,998,485
TELEMETERING APPARATUS
Filed April 30, 1959    3 Sheets-Sheet 3
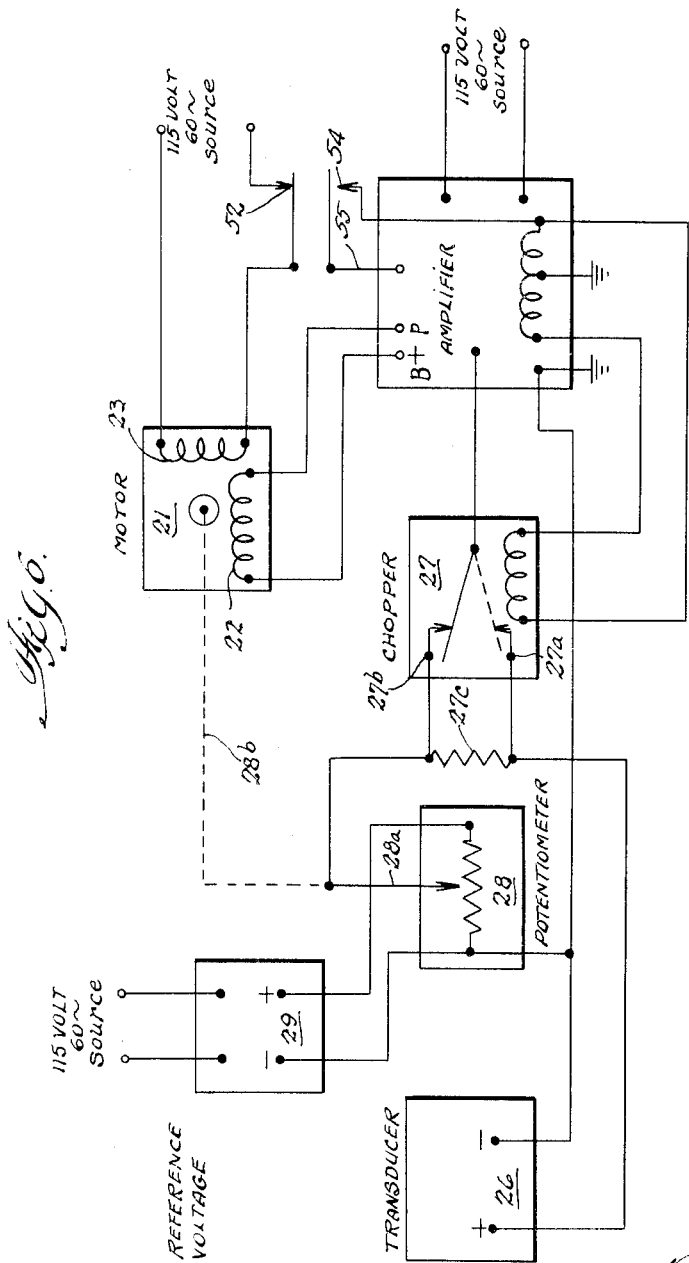
INVENTOR.
Raymond E. Zenner.
BY
Olson, Mecklenburger, van Holst,
Pendleton & Neuman.

United States Patent Office 2,998,485
Patented Aug. 29, 1961

2,998,485
TELEMETERING APPARATUS
Raymond E. Zenner, Park Ridge, Ill., assignor to Comptometer Corporation, Chicago, Ill., a corporation of Illinois
Filed Apr. 30, 1959, Ser. No. 810,087
8 Claims. (Cl. 178—26)

This invention relates to telemetering apparatus and more particularly to apparatus for converting electrical signals from a data-measuring instrument into a transmittable telegraph code.

Quite often it is desirable to obtain measurements of physical data such as, for example, wind direction, wind velocity, barometric pressure or temperature from a remote location. The measurement of this data may be taken directly by an observer at the location, but in most instances this is neither convenient nor practical. It is therefore one particular object of this invention to provide improved apparatus for permitting the transmission of a data measurement over long distances without requiring a direct observation of the measuring instrument.

Data measurements may be obtained from an instrument electrically by means of a special transducer circuit. The electrical output of the instrument-transducer circuit is related to the physical data measured by the instrument. For example, the voltage output of the circuit may be directly or inversely proportional to the physical data measurement. By using a transducer it is not necessary to directly observe the instrument in order to obtain a reading. However, the output of a transducer circuit may not be conveniently transmitted directly over long distances without adversely affecting the accuracy of the reading and without involving a multitude of special circuits and wiring. It is therefore another object of this invention to provide improved apparatus for automatically converting, at the situs of the instrument, the output signal from the instrument-transducer circuit into a telegraph code which may be transmitted over long distances.

It is a further object of this invention to provide improved apparatus having a high degree of accuracy and reliability for converting the output of an instrument-transducer circuit into a readily transmittable telegraph code.

It is still a further object of this invention to provide a compact, flexible apparatus for quickly, reliably and accurately converting electrical signals from a data-measuring instrument into a readily transmittable telegraph code.

It is another object of this invention to provide an improved apparatus for converting electrical signals from a data-measuring instrument into a telegraph code without any accompanying delay and loss of line time.

It is another object of this invention to provide improved apparatus for quickly, accurately and reliably converting any one of a large number of signals from a data-measuring instrument into a readily transmittable telegraph code, which apparatus may be readily maintained by personnel accustomed to servicing printing telegraph apparatus.

Other objects may be seen and a fuller understanding of the invention may be had by referring to the following description and claims taken in conjunction with the accompanying drawings.

In accordance with one embodiment of this invention the apparatus comprises two elements which are relatively positionable with respect to each other according to the signal received from the instrument and which are equipped to transmit their relative position in the form of a telegraph signal. The first element, which is preferably a cylindrical drum, has a multitude of data electrically coded in discrete areas on its surface. The coded data covers at least that range of quantitative measurements which the instrument may be expected to detect and measure. The second element has a number of electrical contacts for selectively engaging the discrete coded surface areas of the drum, and this second element is electrically connected to an XD telegraph unit which transmits the electrical impulses from the contacts to the telegraph circuit according to a predetermined time sequence. The first element or drum is rotatably movable with respect to the second element among a number of predetermined positions. In each of the predetermined positions the electrical contacts of the second element engage one of the aforementioned discrete electrically coded areas on the surface of the first element and a circuit is completed which will effect the transmission of a telegraph signal identifying the data coded on that surface area. The apparatus relates the coded area thus engaged and the identifying telegraph signal transmitted to the actual measurement of the instrument. Motive means on the apparatus receives signals from the measuring instrument and is responsive to a predetermined actuation signal for moving the drum among its predetermined positions. A control operatively connected to the movable drum element regulates the signal applied to the motive means according to the relative angular position of the drum. The angular position of the drum and thus the particular coded area presented to the electrical contacts connecting the apparatus to the telegraph system are therefore determined by the signal from the measuring instrument.

In order to provide the apparatus with a high degree of accuracy and reliability and to permit an exceptionally large amount of data to be coded on the surface of the rotating drum, a special aligning system is provided. This system includes position-detecting means for determining whether the drum is exactly in one of its predetermined positions; for example, only when the drum is exactly in one of these positions may the coded signal corresponding to that position be properly transmitted. Means are provided for applying a signal to the motive means when the drum is in other than one of its predetermined positions, and this applied signal effects movement of the drum into proper alignment in its nearest position. The aligning system is one of the important features of this invention.

With reference to the drawings:
FIGURE 1 is a perspective view of apparatus constructed in accordance with this invention;
FIG. 2 is an elevational view of the apparatus illustrated in FIG. 1 showing the aligning system;
FIG. 3 is a partial plan view of the apparatus showing the aligning system;
FIG. 4 is a partial view of the position-detecting means showing the relative structural relationships between the parts thereof when the rotatably movable drum is between two of its predetermined positions;
FIG. 5 is a partial view of the position-detecting means showing the structural relationship between parts thereof when the rotatably movable drum is in one of its predetermined positions; and
FIG. 6 is a diagram of the wiring which is used in one embodiment of this invention.

The apparatus constructed in accordance with this invention is adapted to be used with a telegraph or Teletype system. The signals from this apparatus are applied to a line distributor which arranges them in proper sequence for telegraph or Teletype transmission.

As best illustrated in FIG. 1, the telemetering apparatus 10 includes a plurality of contact elements 12 which are electrically connected to and for practical purposes form a part of a terminal block 14. The output from the terminal block is transmitted to the line distributor and thence to the telegraph or Teletype system. The line distributor and the other parts of the telegraph system with which the apparatus may be used are well known in their construction and operation. These elements have not been herein illustrated or described in detail inasmuch as they form no part of this invention.

The telemetering apparatus 10 is mounted on a frame 16, and the position of terminal block 14 is fixed with respect to this frame. Contacts 12 are mounted on a shaft 13 which is pivotally mounted on frame 16. Rotatably mounted on a shaft 17 journaled in frame 16 is cylindrical drum 18. This drum is constructed of an electrically conductive material, and its outer surface 18a is covered with a durable insulating material such as baked epoxy resin. Surface 18a is electrically coded with all of the data or other information which may be transmitted through this apparatus and which may be expected to be measured by the instrument. The coding of surface 18a is preferably accomplished by rendering certain areas of this surface electrically conductive. For this purpose a plurality of silver-plated pins 20 may be inserted within holes drilled in the surface of drum 18. Pins 20 are aligned in circumferential rows about the periphery of drum 18. These circumferential rows correspond in number and location with the number and position of contacts 12. Thus as drum 18 rotates, the electrically conductive pins 20 in the first row or location 20a are engageable by the first electrical contact 12a and each of the other contacts 12 is engageable with a respectively located row of pins 20 on the drum.

In addition to the aforementioned circumferential alignment, pins 20 are aligned axially, that is, on lines parallel to the axis of drum 18. Each axial row of pins 20 corresponds to a predetermined angular position of drum 18 with respect to contacts 12. The number of predetermined positions thus corresponds to the number of axial rows of pins. Each time an axial row of pins moves into position for engagement by contacts 12 and thus each time drum 18 moves to a different predetermined position, a different coded signal will be transmitted through contacts 12 and terminal block 14 into the telegraph system when the contacts close on the pins by rotation of shaft 13. The presence or absence of a contact pin 20 in any of the locations in an axial row "keys" or conveys intelligence to the telegraph system. If there are 200 axial rows of pins the apparatus is capable of transmitting at least 200 different instrument readings. If the instrument with which the apparatus is used measures temperatures, drum 18 may be coded with 200 temperature readings—for example, from —50° F. to +150° F. in 1° increments. The information which is transmitted to the telegraph system is completely dependent upon the axial row of pins 20 which is engaged by contacts 12, and this is dependent upon the angular position of drum 18.

The movement of drum 18 to and through its various angular positions is effected by means of a servo motor 21 which is responsive to the combination of two signals. One of these signals may be applied to a control winding 22 and the other signal, which is a reference or fixed voltage, may be applied to a reference winding 23. The circuits for applying these two signals are independent in the embodiment illustrated in FIG. 6. When the apparatus is actuated into operation, which may be remotely controlled through the telegraph system, the reference winding 23 is connected to a voltage supply of fixed input. When this reference winding is energized, the operation of the motor 21 is completely dependent upon the signal applied to the control winding 22. Thus when a signal of predetermined magnitude or characteristic is applied to the control winding motion is imparted to the drum 18 through gears 24 and 25.

The application of the signal to the control winding of the motor is diagrammed in FIG. 6. In this embodiment the output from the instrument-transducer 26 is applied to one terminal of a resistor 27c and to terminal 27a of a chopper 27, which may be a make-before-break type to smooth the output signal and to increase sensitivity. A reference signal is applied to the opposite terminal of resistor 27c and to terminal 27b of the chopper through a potentiometer 28. The reference supply 29 has an output of predetermined magnitude which is at least as great as the output of the transducer circuit. Thus the difference in potential across resistor 27c is applied to the chopper and determines the movement of the servo mechanism. When this difference is zero the movement of the servo mechanism stops. The voltage supply and the transducer circuit are preferably connected to a common ground. One side of the potentiometer is also preferably connected to the common ground.

The potentiometer 28 is mounted on frame 16, and the slidewire 28a thereof is mechanically connected to drum 18 by means such as gears, schematically illustrated in FIG. 6 by broken line 28b, the connection being such that the output from the potentiometer is governed by the angular position of the drum. The potentiometer output is connected to the chopper, and the output of the chopper is applied through an amplifier to the control winding 22 of motor 21.

The control winding 22 of motor 21 will be energized when the voltages applied to the chopper by the instrument transducer and the voltage supply are unequal and unbalanced. The motor will move both drum 18 and potentiometer slidewire 28a until potentiometer 28 balances the voltage applied to the chopper from supply 29 with the voltage applied to the chopper from the instrument transducer. When the voltages are thus balanced, the signal from the chopper to the amplifier is no longer effective to energize the control winding 22 and operate motor 21. At this point, drum 18 stops rotating and comes to rest. The angular position of the drum is thus determined by the magnitude of the signal from the instrument transducer circuit.

Drum 18 may or may not come to rest in one of its predetermined positions wherein the engaging portions of contacts 12 align with an axial row of electrically conductive pins 20. Factors such as friction changing tube characteristics or line voltages may have some slight effect upon the positioning of the drum. Also, the precise reading of the physical data measuring instrument may not be coded on the surface of drum 18. For example, the barometric pressure of 30.49 inches may be precisely measured by the instrument and the voltage corresponding thereto applied through the chopper and amplifier to the control winding 22. However, the information coded on the surface of drum 18 may not be so precise, that is 30.50 inches and 30.48 inches may be as close as the coded information comes to the actual measurement, and for most purposes this is sufficiently accurate. If the drum 18 stops between the two positions, one of which is coded with 30.48 inches and the other of which is coded with 30.50 inches, means must be provided to move the drum into one of these positions in order that the coded intelligence may be transmitted to the telegraph system.

The mechanism for precisely aligning drum 18 in a predetermined position after it has been positioned by the input signal to the servo motor is one of the features of this invention. Affixed to drum 18 is annular gear-like member 30. This member which rotates with drum 18 has a number of notches or other configurations 32 formed on its periphery. A lever element 34 is pivotally mounted on frame 16 and has an arm 36 which is adapted to move along a path transverse to the movement of the peripheral edge of member 30.

Arm 36 has a configuration thereon which will mate with, i.e. assume a certain relationship with, one of the configurations 32 on member 30 when, and only when, drum 18 is exactly in one of its predetermined positions. In the illustrated embodiment arm 36 is a blade or knife edge which bottoms in one of the notch configurations in member 30. There are, of course, many other configurations and mating positions which arm 36 and member 30 could have. For example, in each predetermined position, arm 36 could engage a protuberance rather than a notch.

A solenoid 40 may be used to move blade 36 into engagement with element 30 for determining whether drum 18 is in one of its predetermined positions. As illustrated in FIGS. 2 and 3, the movable core 42 of the solenoid is connected to a lever 44 which is pivotally movable about shaft 13. Lever 44 is urged by means of spring 46 toward its illustrated normal position and is movable by solenoid 40 to a second operable position. A second lever 47 is keyed to shaft 13 and is connected to lever 44 by spring 48. Lever 47 shown in its normal position is movable by the solenoid 40 with lever 44 by virtue of the spring 48 toward its second operative position. When lever 47 is in its normal position, contacts 12 which are also connected to shaft 13 and movable therewith are retracted as illustrated in FIG. 1. Contacts 12 are brought down onto the surface of drum 18 of engagement with pins 20 when lever 47 is in its second operative position. Lever 47 is connected to member 34 by means of a link 50, and when lever 47 is in its normal position arm 36 of member 34 is completely disengaged from member 30, as best seen in FIGS. 1 and 3.

Lever 47 operates two stitches 52 and 54. Switch 52 controls the reference winding 23 of the servo motor 21. Only when this switch is closed may the reference winding be energized and the motor operated. Switch 54 completes a circuit 55 which will energize the control winding 22 of the servo motor 24 independently of control potentiometer 28 and chopper 27. As will be seen, this circuit is completed to energize the control winding 22 only after the drum 18 has been positioned by the input signal from the transducer circuit as previously described.

Two nonconductive finger-like cams 56 and 58 are also keyed to and movable with shaft 13. Finger 56 operates switch 52 and finger 58 operates switch 54. The switches are each closed by the movement of its respective operating finger thereagainst to depress a movable spring loaded contact of the switch into engagement with the other contact. In the normal position of lever 47 and shaft 13, as illustrated, finger 56 is firmly engaged with movable contact 52a of switch 52, closing this switch and permitting the energizing of the servo motor reference winding 23. In this position of lever 47 finger 58 is in close proximity with or may even engage the movable contact 54a of switch 54 but is not pressing sufficiently to close this switch. This normal position of the switches and levers as illustrated in FIGS. 1 through 3 prevails during such time as the apparatus 10 is at rest and during the positioning of drum 18 by input signals to the control winding through the chopper.

After the signal from the instrument-transducer circuit has been balanced as previously described and the drum 18 has come to rest, solenoid 40 is actuated to exactly align drum 18 in one of its predetermined positions. Core 42 of the solenoid moves inwardly in the direction of the arrow (downwardly in FIG. 2), and lever 44 is pivoted about the axis of shaft 13. Lever 47, which is connected to lever 44 by means of spring 48, follows the movement of lever 44, and shaft 13 on which lever 47 is keyed is thereby rotated about its axis. Movement of lever 47 also results in a linear movement of link 50 and pivotal movement of element 34. Movement of lever 47, shaft 13 and element 34 continues until blade 36 of element 34 engages member 30.

If drum 18 is precisely in one of its predetermined positions, blade 36 bottoms in one of the notches 32 in member 30 as illustrated in FIG. 5, arm 47, shaft 13 and fingers 56 and 58 will have been permitted to move sufficiently to sequentially close switch 54 and open switch 52. The opening of switch 52 in the reference winding circuit stops operation of the motor 21 to prevent possible damage.

If, on the other hand, drum 18 is not precisely in one of its predetermined positions, blade 36 will not be properly aligned with one of the grooves 32 in member 30 but rather will engage a tooth or intermediate portion of member 30 as illustrated in FIG. 4. The movements of element 34, link 50, lever 47 and shaft 13 thus will be restricted. Under such circumstances lever 47, shaft 13 and the camming fingers keyed thereon will be permitted to rotate only a sufficient distance for finger 58 to close switch 54 and they will not be permitted to rotate sufficiently for finger 56 to open switch 52 or for contacts 12 to engage the coded surface of drum 18. Thus both the reference winding circuit and circuit 55 for applying an independent signal to the control winding 22 of the motor are energized and the motor is operated to move drum 18. The movement is slight, however, for as soon as drum 18 and member 30 are moved blade 36 will bottom in a notch 32, locking drum 18 in position and permitting lever 47, shaft 13 and the switch operating fingers to further rotate until finger 56 moves away from and permits the opening of switch 52, thus de-energizing the reference winding 23 of the motor.

When the drum 18 is precisely in one of its predetermined positions and blade 36 is bottomed in a notch in member 30, lever 47 and shaft 13 will have rotated sufficiently for contacts 12 to close upon and engage the axial row pins 20 on the surface of drum 18 which are presented to the contacts in that drum position. Upon this engagement by contacts 12 an electrical input signal is applied through pins 20 of the drum. Those pins 20 which are in the axial row engaged by contacts 12 relay the coded signal to the telegraph system in accordance with the arrangement of pins in that row.

The invention may be modified in a number of ways, for example, the coded element may be other than a drum and this element may be fixed while the contacts 12 move relatively thereto. The relative movement of either of these members may be controlled in the manner as previously described and the aligned system will also function as described. It is evident also that the input to the control winding of the motor may be controlled by and applied through a synchro system eliminating the balancing potentiometer and the chopper. The synchro system would then be controlled by being linked to the movable element or servo motor. The apparatus may also be used with A.C. transducers.

It may be seen that the apparatus constructed in accordance with this invention is very accurate and reliable for converting electrical signals from an instrument-transducer circuit into an easily transmittable telegraph code. The operation is very quick, eliminating loss of line time. The apparatus is very versatile and compact and may be easily serviced and maintained by personnel accustomed to servicing printing telegraph apparatus. The drum is capable of storing large quantities of data.

Although the invention has been described with a certain degree of particularity, it is understood that the present disclosure has been made only by way of example and that many modifications and changes in various details may be resorted to without departing from the spirit and scope of the invention, as hereinafter claimed.

I claim:
1. An apparatus for converting electrical signals from a data measuring instrument into a telegraph code, said apparatus comprising a first element having certain preselected instrument-measurable data coded in discrete areas on its surface, a second element having portions for selectively engaging the discrete coded surface areas of said first element to effect keying of the telegraph system in accordance with the data coded thereon, one of said elements being relatively movable with respect to the other of said elements among a number of predetermined positions in which a discrete coded surface area of the first element is engaged by said portions of said second element, positioning means for receiving a signal from the measuring instrument and for positioning said movable element relative to the other of said elements according to the signal received, means for determining whether said movable element is exactly in one of its predetermined positions, and means for applying a signal to said positioning means when said movable element is not aligned in one of its predetermined positions to effect movement of said movable element into proper alignment in its nearest predetermined position.

2. An apparatus for converting electrical signals from a data measuring instrument into a telegraph code, a first element having certain preselected instrument-measurable data coded in discrete areas on its surface, a second element having portions for selectively engaging the discrete coded surface areas of said first element to effect keying of the telegraph system in accordance with the data coded thereon, motive means adapted to receive signals from the measuring instrument, said motive means being responsive to a predetermined actuation signal for moving one of said elements relative to the other of said elements among a number of predetermined positions in which a discrete coded surface area of the first element is engaged by the surface contacting portions of said second element, a control operatively connected to said movable element for regulating the signal applied to said motive means according to the position of said movable element, whereby the position of the movable element is determined by the signal from the measuring instrument, means for determining whether said movable element is exactly in one of its predetermined positions, and means for applying a signal to said motive means when said movable element is not aligned in one of its predetermined positions for effecting movement of said movable element into proper alignment in its nearest predetermined position.

3. An apparatus for converting electrical signals from a data measuring instrument into a telegraph code, a first element having certain preselected instrument-measurable data coded in discrete areas on its surface, a second element having portions for selectively engaging the discrete coded surface areas of said first element to effect keying of the telegraph system in accordance with the data coded thereon, motive means adapted to receive signals from the measuring instrument, said motive means being responsive to a predetermined actuation signal for moving one of said elements relative to the other of said elements among a number of predetermined positions in which a discrete coded surface area of the first element is engaged by the surface contacting portions of said second element, a control operatively connected to said movable element for regulating the signal applied to said motive means according to the position of said movable element, whereby the position of the movable element is determined by the signal from the measuring instrument, a first member operatively connected to said movable element and adapted to move therewith relative to said other element, a second member movable along a path fixed with respect to said other element into and out of engagement with said first member, said members having configurations thereon which mate only when said movable element is in one of its predetermined positions, and means for applying a signal to said motive means when the configurations on said members do not mate for effecting movement of said movable element into proper alignment in its nearest predetermined position wherein the configurations on said members mate.

4. The structure of claim 3 wherein one of said members has a plurality of repeated configurations thereon and the other of said members has a single configuration thereon and moves along a path transverse to the path of said first member.

5. An apparatus for converting electrical signals from a data measuring instrument into a telegraph code, a first element having certain preselected instrument-measurable data coded in discrete areas on its surface, a second elment having portions for selectively engaging the discrete coded surface areas of said first element to effect keying of the telegraph system in accordance with the data coded thereon, motive means adapted to receive signals from the measuring instrument, said motive means being responsive to a predetermined actuation signal for moving one of said elements relative to the other of said elements among a number of predetermined positions in which a discrete coded surface area of the first element is engaged by the surface contacting portions of said second element, a control operatively connected to said movable element for regulating the signal applied to said motive means according to the position of said movable element, whereby the position of the movable element is determined by the signal from the measuring instrument, a first member operatively connected to said movable element and adapted to move therewith relative to the other of said elements, said first member having a plurality of repeated configurations thereon, a second member movable along a path fixed with respect to the other of said elements transversely into and out of engagement with said first member, said second member having a configuration thereon adapted to mate with a configuration on said first member when said movable element is precisely in one of its predetermined positions, and switch means operated by said second member and being normally closed to permit the energizing of said motive means, said switch means being adapted to open when the configurations on said members mate to prevent the energizing of said motive means, and means for applying a signal to said motive means when the configurations on said members do not mate for effecting movement of said movable element into proper alignment in its nearest predetermined position wherein said configurations mate.

6. An apparatus for converting electrical signals from a data measuring instrument into a telegraph code, a first element having certain preselected instrument-measurable data coded in discrete areas on its surface, a second element having portions for selectively engaging the discrete coded surface areas of said first element to effect keying of the telegraph system in accordance with the data coded thereon, motive means adapted to receive signals from the measuring instrument, a reference circuit for applying reference voltage to said motive means, and a switch for controlling said reference circuit, said motive means being responsive to the combination of a reference voltage and a simultaneously applied predetermined actuation signal for moving one of said elements relative to the other of said elements among a number of predetermined positions in which a discrete coded surface area of the first element is engaged by the surface contacting portions of said second element, a control operatively connected to said movable element for regulating the signal applied to said motive means according to the position of said movable element, a first member operatively connected to said movable element and adapted to move therewith relative to the other of said elements, a second member movable along a path fixed with respect to the other of said elements transversely thereto into and out of engagement with said first member, said members having configurations thereon which mate only when said movable element is precisely in one of its predetermined positions, said reference circuit switch being opened when the configurations on said members mate to prevent the actuation of said motive means, and electrical aligning circuit for applying a predetermined signal to said motive means independent of said control when the configurations on said members do not mate, whereby said movable element is moved into proper alignment in its nearest predetermined position wherein said configurations mate.

7. An apparatus for converting electrical signals from a data measuring instrument into a telegraph code, a first element having certain preselected instrument-measurable data coded in discrete areas on its surface, a second element having portions for selectively engaging the discrete coded surface areas of said first element to effect keying of the telegraph system in accordance with the data coded thereon, motive means responsive to the combination of a reference voltage and a simultaneously applied predetermined actuation signal for moving one of said elements relative to the other of said elements among a number of predetermined positions in which a discrete coded surface area of the first element is engaged by the surface contacting portions of said second element, a reference circuit for applying reference voltage to said motive means, and a switch for controlling said reference circuit, a chopper for applying a signal to said motive means and for receiving two independent input signals one of which is applied by the measuring instrument, an electrical supply for generating a signal of predetermined magnitude, control means operatively connected to said movable element for applying the signal from said supply to said chopper and for varying the magnitude of said applied supply signal in accordance with the position of said movable element whereby the resultant signal applied through said chopper to said motive means is effective to operate said motive means and move said movable element to a position wherein said control means balances the supply signal applied to the chopper with that of the signal from the measuring instrument, a first member operatively connected to said movable element and adapted to move therewith relative to the other of said elements, a second member movable along a path fixed with respect to the other of said elements transversely thereto into and out of engagement with said first member, said members having configurations thereon which mate only when said movable element is precisely in one of its predetermined positions, said reference circuit switch being opened when the configurations on said members mate to prevent the actuation of said motive means, and electrical aligning circuit for applying a predetermined signal to said motive means independent of said control when the configurations on said members do not mate, whereby said movable element is moved into proper alignment in its nearest predetermined position wherein said configurations mate.

8. An apparatus for converting electrical signals from a data measuring instrument into a telegraph code, a first element having certain preselected instrument-measurable data coded in discrete areas on its surface, a second element having portions for selectively engaging the discrete coded surface areas of said first element to effect keying of the telegraph system in accordance with the data coded thereon, motive means adapted to receive signals from the measuring instrument, said motive means being responsive to a predetermined actuation signal for moving one of said elements relative to the other of said elements among a number of predetermined positions in which a discrete coded surface area of the first element is engaged by the surface contacting portions of said second element, a chopper for applying a signal to said motive means and for receiving two independent input signals one of which is applied by the measuring instrument, an electrical supply for generating a signal of predetermined magnitude, and control means operatively connected to said movable element for applying the signal from said supply to said chopper and for varying the magnitude of said applied supply signal in accordance with the position of said movable element, whereby the resultant signal applied through said chopper to said motive means is effective to operate said motive means and move said movable element to a position wherein said control means balances the supply signal applied to the chopper with that of the signal from the measuring instrument, a first member operatively connected to said movable element and adapted to move therewith relative to the other element, a second member movable along a path fixed with respect to said other element into and out of engagement with said first member, said members having configurations thereon which mate only when said movable element is in one of its predetermined positions, and means for applying a signal to said motive means when the configurations on said members do not mate to effect movement of said movable element into proper alignment in its nearest predetermined position wherein the configurations on said members mate.

References Cited in the file of this patent

UNITED STATES PATENTS 2,872,671  Walton _____ Feb. 3, 1959

OTHER REFERENCES

"Practical Analog-Digital Convertors," Instruments and Automation, June 1956, pages 1109 to 1117. (Copy in U.S. Patent Office Scientific Library.)

UNITED STATES PATENT OFFICE
CERTIFICATE OF CORRECTION

Patent No. 2,998,485                            August 29, 1961

Raymond E. Zenner

It is hereby certified that error appears in the above numbered patent requiring correction and that the said Letters Patent should read as corrected below.

Column 5, line 21, for "of" read -- for --; line 27, for "stitches" read -- switches --; column 8, line 2, for "elment" read -- element --.

Signed and sealed this 23rd day of January 1962.

(SEAL)
Attest:

ERNEST W. SWIDER
Attesting Officer

DAVID L. LADD
Commissioner of Patents